(No Model.) 2 Sheets—Sheet 1.
G. A. SCHEEFFER.
DYNAMO ELECTRIC MACHINE.
No. 579,012. Patented Mar. 16, 1897.
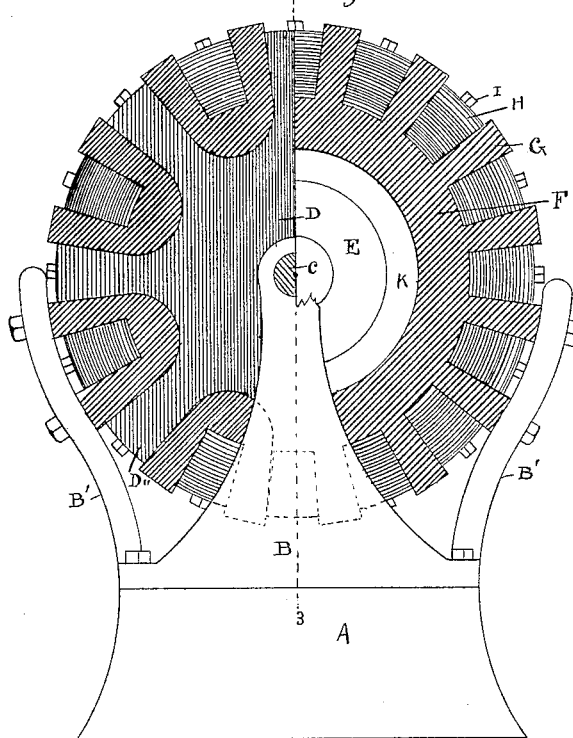
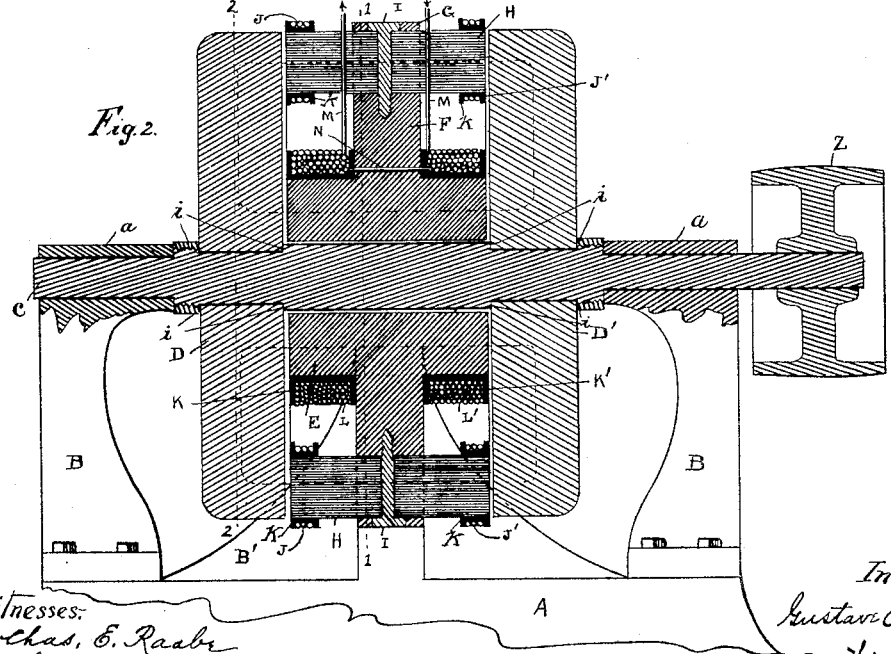
Witnesses:
Chas. E. Raabe
Chas. Krenz
Inventor
Gustav A. Scheeffer
By William V. Lifft
Atty.

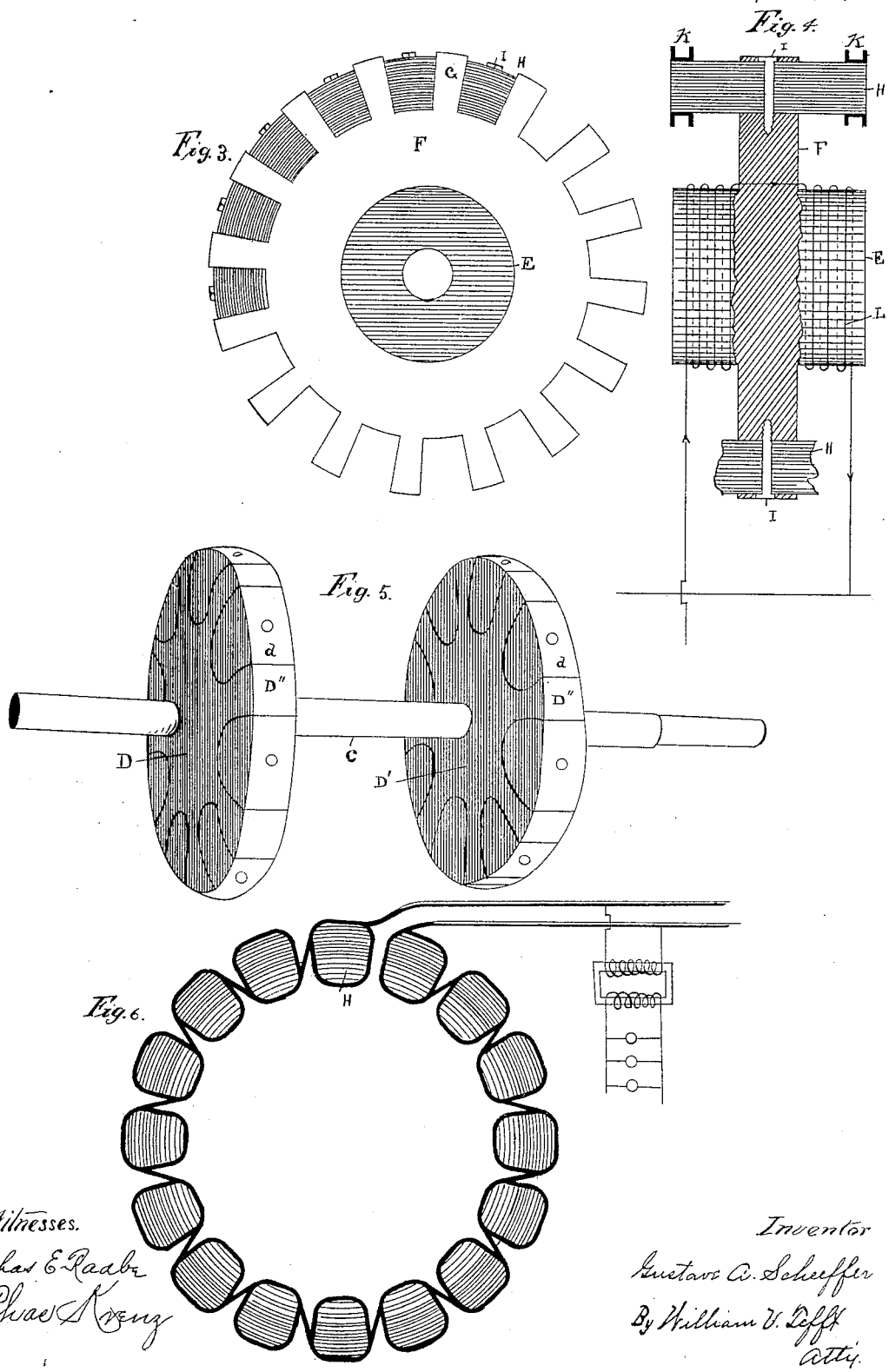

UNITED STATES PATENT OFFICE.

GUSTAVE A. SCHEEFFER, OF PEORIA, ILLINOIS, ASSIGNOR TO THE ROYAL ELECTRIC COMPANY, OF SAME PLACE.

DYNAMO-ELECTRIC MACHINE.

SPECIFICATION forming part of Letters Patent No. 579,012, dated March 16, 1897.

Application filed April 30, 1892. Serial No. 431,298. (No model.)

*To all whom it may concern:*

Be it known that I, GUSTAVE A. SCHEEFFER, a citizen of the United States, residing at Peoria, in the county of Peoria and State of Illinois, have invented certain new and useful Improvements in Dynamo-Electric Machines; and I do hereby declare that the following is a full, clear, and exact description of the invention, which will enable others skilled in the art to which it appertains to make and use the same.

My invention relates to certain new and useful improvements in dynamo-electric machines of the class in which electric currents are generated by varying the magnetic flux through stationary armature-coils.

The object is to secure a compact and efficient machine in which lamination may be reduced to a minimum.

In the accompanying drawings, Figure 1 is a partly sectional side elevation of the machine, the section being along the line 1 1, Fig. 2. Fig. 2 is a section on the line 3 3, Fig. 1. Fig. 3 shows the field-magnet core and armature-frame with several armature-blocks in position. Fig. 4 is a partial axial section through the devices of Fig. 3. Fig. 5 shows in perspective certain pole-pieces with the shaft upon which they are fixed. Fig. 6 is a diagrammatical illustration of the armature-winding and the external circuit connection.

In all the figures where the letters occur, A is the bed of the machine, and B are standards rising therefrom and provided with bearings $a$ for a shaft C, which carries all the moving part and is driven by a belt-pulley Z. Upon the central portion of the shaft is a field-magnet core E, and projecting outward centrally from this core is an armature-frame consisting of an annular portion F and circumferential projections G thereon. The armature-frame is rigidly fixed to a saddle B' B', rising also from the bed A. In the several spaces between the projections G transverse laminated armature-blocks H are secured in any suitable manner, as shown by bolts I. Each end of each block bears an armature-coil J J', insulated from the frame of the machine by a non-magnetic spool K or the like. The coils are suitably connected, as, for example, in Fig. 6, where they are shown as wound alternately in opposite directions. This mounting of coils gives two sets in parallel planes, with the coils of each set disposed in a circle about the shaft C and at some distance therefrom. Encircling the field-magnet core upon opposite sides of the frame F G are two spools of non-magnetic metal, preferably copper, and upon the spools are wound field-magnet or energizing coils L, receiving current from any suitable external source. At each end of the core E is an approximately star-shaped pole-piece or core extension D D', fixed to the shaft C in such position that its inner face is closely adjacent to both the end of the core E and the corresponding ends of the armature-blocks H with the coils thereon. The spaces between the projections or poles D'' of the core extensions may be filled by non-magnetic blocks $d$ to prevent air-washing, and that portion of the inner face of each which passes in close proximity to the armature-blocks may be laminated to reduce Foucault currents.

To produce the desired variation through the armature-coils, the number of poles is made equal to one-half the number of coils, but of course the numbers in the figures are not invariable.

The core E, the spools thereon bearing the field-magnet coils L, the armature-frame, and the laminated armature-blocks bearing the armature-coils all lie between the two rotating pole-pieces or magnetic core extensions and form with the latter two exactly similar mechanisms, which act independently in that each may generate an independent current. Now when the coils L receive energy from a battery or exciter the core E is magnetized, and its ends become, respectively, north and south poles, and the projections D'' upon one of the core extensions become a set of north poles, while those upon the other extension become a set of south poles. When the shaft is rotated, the projections, being essentially prolongations of the field-magnet core, transmit the flux to the corresponding laminated blocks or cores, which now exhibit polarity contrary to that of the adjacent rotating projections, and as these latter pass in front of the alternate coils a rise and fall in flux through the successive coils ensues, thus generating in a well-known manner an alternating current in the windings.

In generators of this class it is usual to excite a number of field-magnet poles by what is practically a single coil. As the self-induction of a coil depends on the square of the number of turns, any change in the output or exciting-current of the machine, such, for instance, as would be caused if one of the brushes of the exciter were accidentally lifted, tends to produce an enormous electromotive force in the field-magnet coil, and there is great danger of rupture of the insulation. I avoid this difficulty by using, as stated above, field-magnet spools of metal of sufficiently high conductivity to retard any change in the number of lines of force passing through them.

Obviously the two sets of coils may be grouped to produce polyphase currents, as well understood in the art, and various changes in construction may be made without passing beyond the limits of my invention. I do not therefore wish to limit myself to the exact construction and arrangement set forth; but

What I claim is—

1. In a dynamo-electric machine of the inductor type, the combination of a single field-magnet core parallel with and surrounding the shaft, a field-magnet coil wound thereon, a single set of armature-cores parallel with the shaft and arranged in a single circle, coils on said cores, an extension magnetically connecting the field-core with the armature-cores, and a rotatable disk with slots cut in its edge, extending from the end of the field-core to the ends of the armature-cores, and completing the magnetic circuit, substantially as described.

2. In a dynamo-electric machine of the inductor type, the combination of a shaft, a core, a pair of field-magnet coils surrounding said core, an extension for said core between the two field-magnet coils, a single set of armature-cores lying parallel with the shaft, arranged in a circle and connected to said extension, armature-coils on said cores, and a pair of inductors, capable of rotation relatively to said armature cores and coils, closing the magnetic circuit between the central core and the armature-cores, substantially as described.

3. In a dynamo-electric machine of the inductor type, the combination of a shaft, a core, a pair of field-magnet coils surrounding said core, an extension for said core between the two field-magnet coils, a single set of armature-cores connected to said extension and lying parallel to the shaft arranged in a circle, armature-coils on said cores, and a pair of inductors, in the shape of star disks, one at each end of the machine, capable of rotation relatively to said armature-coils, closing the magnetic circuit between the central core and the armature-cores, substantially as described.

4. In a dynamo-electric machine of the inductor type, the combination of a single field-magnet core parallel with and surrounding the shaft, a field-magnet coil wound thereon, a single set of armature-cores parallel with the shaft and arranged in a circle, coils on said cores, an extension magnetically connecting the field-core with the armature-cores, and a rotatable disk with slots cut in its edge, extending from the end of the field-core to the ends of the armature-cores, and completing the magnetic circuit, the field-magnet coils being wound on a frame of conducting material placed over the field-core, whereby any sudden change on the magnetomotive forces will be prevented from causing damage to the insulation, substantially as described.

5. The combination with the shaft carrying the separated pole-pieces each provided with peripheral polar projections separated by blocks of non-magnetic material, of the fixed core loosely encircling the shaft between the pole-pieces and provided with the central, peripherally-recessed annular flange, the transverse laminated bar-armatures fixed, respectively, in the recesses of the flange and extending from pole-piece to pole-piece, the secondary coils encircling the core upon opposite sides, respectively, of said flange, two sets of induction-coils mounted upon the opposite ends, respectively, of the armatures, and means for rotating the shaft.

6. In a dynamo-electric machine, the combination of a stationary electromagnet having its coils wound upon the magnetizable mass and separated by a central periphery which extends outwardly and is provided at its outer edge with depressions in which the armatures are carried, as described, the two revoluble polar disks divided at their respective circumferences by suitable blocks into independent polar projections, the series of armatures bearing between the polar disks and mounted in the depressions in the peripheral extensions of the core, and the two sets of induction-coils wound upon the respective ends of the armatures and in front of which are revolved the polar projections from the disks, all substantially as described and for the purpose set forth.

In testimony whereof I affix my signature in presence of two witnesses.

GUSTAVE A. SCHEEFFER.

Witnesses:
W. V. TEFFT,
BOB M'CORMICK.